United States Patent [19]

Kasabian

[11] Patent Number: 4,489,549
[45] Date of Patent: Dec. 25, 1984

[54] GAS GENERATOR WITH RATCHET NO-BACK AND METHOD

[75] Inventor: George Kasabian, Los Angeles, Calif.
[73] Assignee: The Garrett Corporation, Los Angeles, Calif.
[21] Appl. No.: 524,047
[22] Filed: Aug. 17, 1983
[51] Int. Cl.³ .............................. F02C 3/20; F01N 3/15
[52] U.S. Cl. ................................ 60/39.02; 60/39.462; 60/723; 422/179
[58] Field of Search ............... 60/39.02, 39.462, 200.1, 60/723; 422/177, 179, 219, 221

[56] References Cited

U.S. PATENT DOCUMENTS

| | | | |
|---|---|---|---|
| 3,094,394 | 6/1963 | Innes et al. | 60/299 |
| 3,598,543 | 8/1971 | Crosby et al. | 60/299 |
| 3,838,977 | 10/1974 | Warren | 422/179 |
| 3,899,303 | 8/1975 | Gaysert | 422/177 |
| 4,069,664 | 1/1978 | Ellion | 60/200.1 |
| 4,352,782 | 10/1982 | Daly | 60/299 |

FOREIGN PATENT DOCUMENTS

| | | | |
|---|---|---|---|
| 2300843 | 3/1973 | Fed. Rep. of Germany | 422/177 |
| 2188536 | 3/1974 | France | 422/179 |

Primary Examiner—Carlton R. Croyle
Assistant Examiner—Timothy S. Thorpe
Attorney, Agent, or Firm—Leslie S. Miller; Albert J. Miller

[57] ABSTRACT

A gas generator having a one-way ratchet assembly is disclosed which compensates for compaction and degradation in the catalyst bed to reduce destructive oscillatory vibration in the gas generator, thereby substantially extending the life and assuring dependable performance of the gas generator.

22 Claims, 8 Drawing Figures

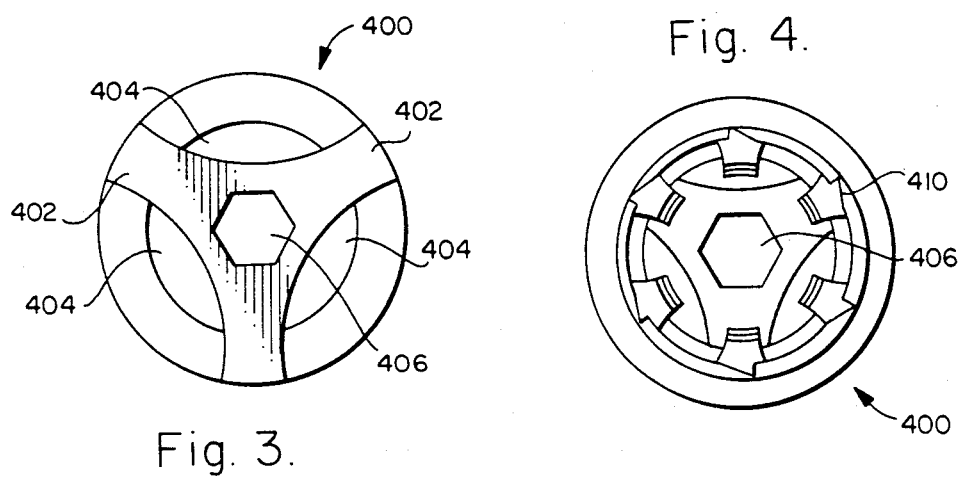
Fig. 3.
Fig. 4.
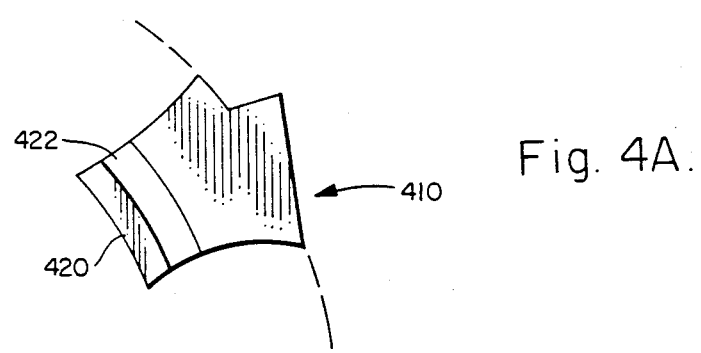
Fig. 4A.
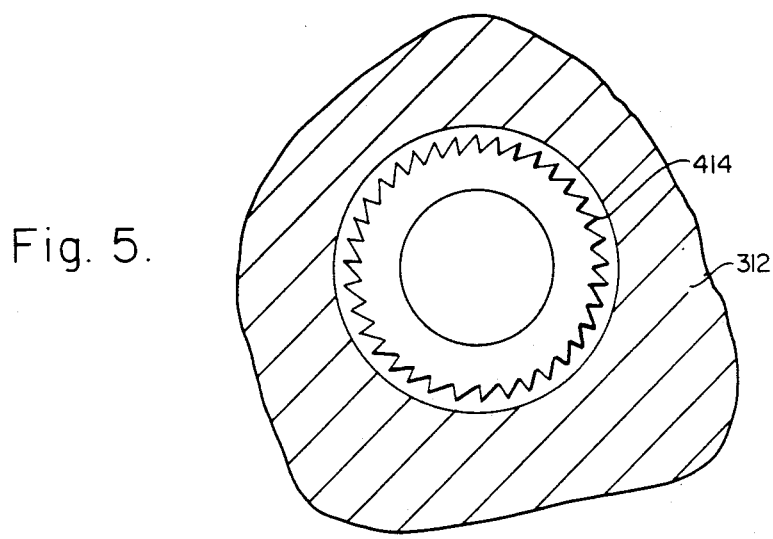
Fig. 5.

GAS GENERATOR WITH RATCHET NO-BACK AND METHOD

RELATED APPLICATIONS

This specification is one of a group of specifications dealing with gas generator technology, all of which are assigned to the present assignee, including: No-Back Gas Generator and Method, Ser. No. 524,049, by Ronald J. Ness; and Emergency Power Unit and Method, Ser. No. 524,048, by Francis K. Weigand, et al, both of which were filed concurrently with this specification.

BACKGROUND OF THE INVENTION

Gas generators, particularly those having application as emergency power units for military aircraft, are small, lightweight, intermittent duty power supply devices which ensure instant, reliable power output even after relatively long dormant periods. Such gas generators typically utilize a pulsed spray of liquid hydrazine into a catalyst bed such as Shell 405, in which production of hot gas occurs. The gas generated by the device may then be used to drive a turbine wheel, which may power such devices as engine starters, electrical generators, and hydraulic pumps.

Gas generators for military applications are designed to be reusable, with only a minimal amount of maintenance being required between uses. It is therefore imperative that the gas generator be capable of a consistent and reliable level of performance involving repeated usage over an extended period of time without requiring major overhaul, rebuilding, or replacement of the catalyst.

For optimum performance, the catalyst in the gas generator is located in two distinct beds, a primary bed into which the liquid hydrazine is introduced by a spray nozzle device, and a secondary bed interposed between the primary bed and the location in the generator at which the gas generated exits the device. The liquid hydrazine initially decomposes into a gas in the first catalyst bed, and the characteristics of the gas exiting the device are shaped as the gas travels through the second catalyst bed, reaching a high temperature.

Liquid hydrazine is supplied to the gas generator at a pressure of approximately 400 p.s.i., and gas leaving the generator is at approximately the same pressure. The gas generator is therefore controlled by the amount of liquid hydrazine sprayed into the catalyst beds, which amount determines the volume of gas produced by the gas generator, and therefore controls the speed at which a turbine driven by the gas generator will operate.

In order to precisely control the operating speed of the turbine, liquid hydrazine is pulsed into the catalyst bed rather than supplied in a continuous flow. The speed of the turbine is controlled by varying the rate at which the liquid hydrazine is pulsed into the gas generator, increasing the pulse rate to increase the speed of the turbine, and decreasing the pulse rate to decrease the speed of the turbine. It will be recognized that since the system may operate a generator required to operate at a particular frequency, having precise control of the speed of the turbine, and the volume and other characteristics of the gas produced by the gas generator, is an important requirement.

While the technique of pulsing the liquid hydrazine into the gas generator is highly desireable due to the precise degree of control possible over the power output of the device, the pulsing operation has proven to be extremly destructive to the catalyst beds, drastically limiting the life of the gas generator. The hydrazine liquid pulsed into the gas generator causes an oscillatory movement in the catalyst beds resulting in destructive vibration of the catalyst, which is in the form of particles having a particular size and shape. The vibration in the catalyst beds causes the particles to be broken down into less useful, smaller particles, and finally into dust. The vibration problem is particularly destructive in the primary bed, which is situated immediately adjacent the spray nozzles through which the liquid hydrazine is introduced into the gas generator. As the catalyst particles in the primary bed break up, the dust produced migrates into the secondary bed, which becomes clogged rapidly by the dust, thus increasing the pressure drop across the gas generator. The vibration problem in the primary bed is so severe as to cause significant abrasion on the interior of the gas generator.

In order to minimize this problem, in the past biasing springs have been used to force the secondary catalyst bed, typically enclosed in a porous cylindrical structure, against the primary catalyst bed to compensate for compaction, bed degradation in the primary bed, and/or manufacturing tolerances, and to reduce the amount of vibration occurring therein due to the pulsing hydrazine spray after an initial use of the system. While this technique allows reuse of the gas generator without the necessity to completely rebuild the generator after each use, the number of uses the generator is capable of without requiring rebuilding and replacement of the catalyst is still far less than satisfactory. The initial degradation of the primary catalyst bed is somewhat slower when springs are used to bias the secondary bed against the primary bed, but after initial wear in the primary catalyst bed occurs the catalyst degrades at a quickly increasing rate.

Another factor in the problem is the ambient temperature at which the gas generator is operating. While catalyst degradation is merely unsatisfactory at ambient temperatures of 70° F., at lower operating temperatures the catalyst breakdown rate drastically increases to make the expected lifetime of the gas generator particularly short, rendering the device no longer just unsatisfactory but rather unacceptable. While the number of multiple starts possible at a low ambient operating temperature is a maximum of 5-10, it must be noted that the performance of the gas generator as an engine start device sharply diminishes resulting in a markedly slower turbine acceleration, increasing start time, and drastic catalyst weight loss through increasing oscillatory vibration.

Since one of the most important applications of the gas generator is as an emergency power source for a military aircraft, which typically operates at a high altitude having a low ambient temperature, it can be seen that this type of gas generator will have a fairly short operating life after which a complete rebuilding and replacement of the catalyst bed is necessary. Since the gas generator has application as a component in the emergency power system for the aircraft, any failure in the gas generator could result in loss of the aircraft due to failure to restart the engine or operate the electric or hydraulic system of the plane. It can therefore be appreciated that the gas generator would be required to be rebuilt after virtually every use to ensure that loss of the aircraft does not result from decreased performance of the gas generator due to catalyst degradation from oscillatory vibration.

Although failure of the gas generator resulting in possible loss of an aircraft is of paramount importance, another major concern in premature catalyst degradation is the high cost of rebuilding the gas generator and replacing the catalyst. To rebuild the gas generator, it is necessary to remove the generator from the aircraft and completely disassemble it to replace the catalyst. Such an operation is labor intensive, requiring a substantial amount of time from a skilled technician. In addition, the Shell 405 or like catalyst used in the gas generator is extremely expensive. Although only a small amount of catalyst is contained in the primary and secondary beds of the gas generator, the cost of even the small amount of catalyst may be greater than the cost of the mechanically complete generator. Finally, an additional cost in military applications is that the aircraft must either have a large number of spare gas generators on hand, or else be unavailable for service while the gas generator is being rebuilt.

Thus, it can be seen that a strong need exists for a gas generator having an extended catalyst life allowing the generator to be reused a large number of times while requiring only minimal maintenance between uses. The gas generator must protect the catalyst particles from destructive oscillatory vibration to ensure against loss of the catalyst in the primary bed and clogging of the catalyst in the secondary bed. The gas generator must be capable of functioning reliably at low temperatures, and of providing multiple starts at these low temperatures. Finally, it is desirable that whatever solution is found be adaptable to retrofit existing gas generators to overcome the above-described problems.

SUMMARY OF THE INVENTION

The present invention prevents destructive oscillatory vibration by allowing only one-way movement of the secondary catalyst bed toward the primary catalyst bed, thereby allowing for compaction and degradation of the catalyst while effectively preventing virtually all of the oscillatory vibration previously resulting in destruction of the catalyst. The one-way travel of the secondary bed toward the primary bed thus prebiases the catalyst beds and allows the springs also used to bias the secondary bed against the primary bed to be effective in minimizing wear in the catalyst beds during operation of the gas generator.

The hardware used to prevent movement of the secondary catalyst bed away from the primary bed is a ratchet assembly bearing against the secondary catalyst bed to prevent the secondary catalyst bed from moving away from the primary catalyst bed. The ratchet assembly is designed so that it can be adjusted to compensate between uses for compaction or bed degradation in the primary catalyst bed, the adjustment being made by screwing the ratchet assembly tighter against the secondary catalyst bed contained in the aforementioned porous cylindrical canister.

The ratchet assembly includes ratchet teeth adjacent a number of pawl teeth contained in the gas generator housing, thereby allowing the ratchet assembly to be tightened against the secondary catalyst bed, while the ratchet action of the ratchet teeth and pawl teeth prevent the ratchet assembly from withdrawing away from the secondary catalyst bed.

The ratchet assembly may be adjusted quickly and conveniently without disassembling the gas generator. After each use of a gas generator, it is necessary to replace a shear pin sealing the interior of the gas generator from contamination, and the ratchet assembly may be adjusted in a matter of seconds at the time the shear pin is replaced.

It can therefore be seen that the ratchet assembly allows only one-way movement of the secondary catalyst bed adjacent the primary catalyst bed, and thus substantially reduces destructive oscillatory vibration in the gas generator during operation. In fact, when the present invention is utilized in the gas generator, it has been found that the number of uses before it is necessary to replace the catalyst is dramatically increased. At an ambient temperature of 70° F., use of the ratchet no-back assembly described herein in a gas generator extends the operating life of the gas generator before catalyst replacement is necessary by a factor of 10.

In low ambient temperature operation, particulary important in military aircraft applications, the number of starts possible is increased from a maximum of 5-10 to approximately 300, at least a 30-fold increase in the number of uses provided before catalyst replacement is necessary. It should be noted that the substantially increased number of uses are provided without any loss of generator efficiency due to oscillatory vibration.

The ratchet assembly described herein has also been designed so that it may be retrofit onto existing gas generators, requiring only a relatively minor remachining of the gas generator housing and supplying a few additional parts. With the high cost of replacing the catalyst, the retrofitting operation pays for itself rather quickly given the increase by at least a factor of 10 in the number of multiple starts possible due to the present invention.

It can therefore be seen that the present invention provides an advantageous way of extending the useful life of a gas generator substantially before requiring rebuilding and catalyst replacement, without significant disadvantage. The minimal cost of the device is outweighed by the savings in terms of extended catalyst life, reduced rebuilding labor requirements, and aircraft downtime due to gas generator replacement. Adjustment of the ratchet assembly requires only a few seconds, and may be done during routine aircraft maintenance to replace the shear pin in the gas generator, a standard operation performed with existing gas generators. The present invention thus provides a gas generator having a substantially extended life, assures dependable operation of the gas generator in an emergency, and provides for substantial cost savings.

DESCRIPTION OF THE DRAWINGS

These and other advantages of the present invention are best understood through reference to the drawings, in which:

FIG. 3 is an end view of the ratchet assembly shown from the side in FIG. 1, and illustrates the ratchet support legs which act against the secondary catalyst bed in FIG. 1;

FIG. 4 shows the opposite end of the ratchet assembly shown in FIG. 3, and illustrates the ratchet teeth;

FIG. 4A is an enlarged view of one of the ratchet teeth contained in the ratchet assembly shown in FIG. 4;

FIG. 5 is a cutaway view showing the pawl teeth contained in the housing of the gas generator shown in FIG. 1;

DETAILED DESCRIPTION OF THE PREFERRED EMBODIMENT

Figure 1:
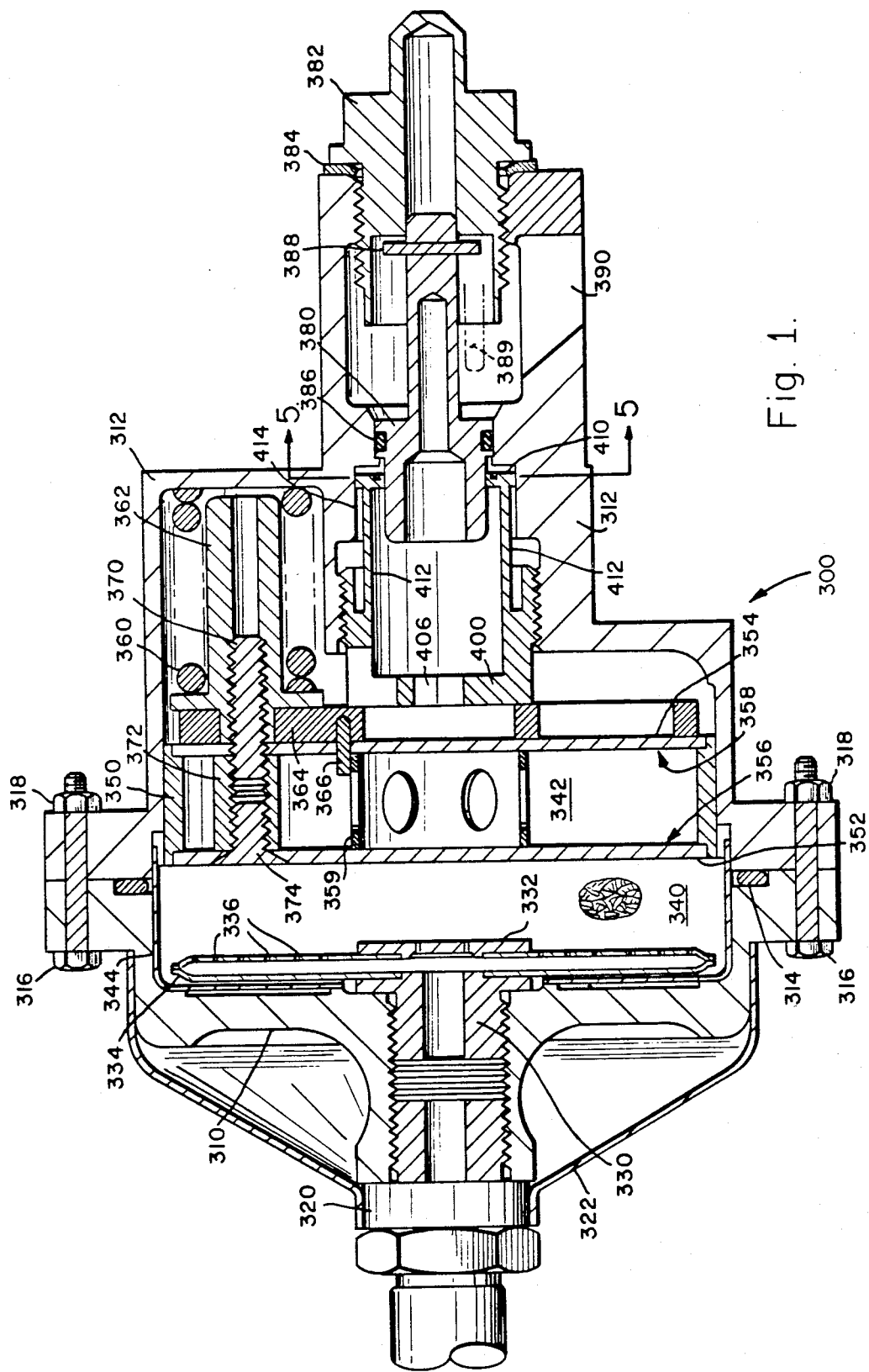
FIG. 1 is a cutaway view of a gas generator embodying the present invention.

A gas generator 300 incorporating the present invention is shown in FIG. 1. The gas generator 300 includes left and right housing halves 310 and 312, respectively, which are sealed by a metal O-ring 314 and held together by a number of bolts 316 and nuts 318 around the perimeters of the housing halves 310, 312.

Figure 2:
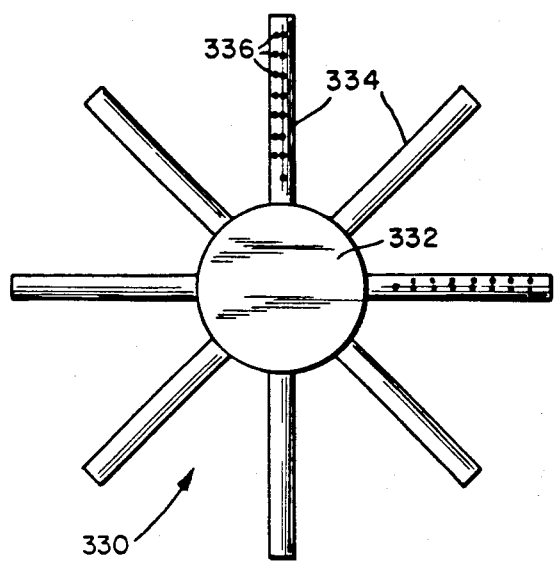
FIG. 2 is a plan view of the injector assembly used in the gas generator shown in FIG. 1.

Liquid hydrazine is supplied to the gas generator 300 through a hydrazine supply hose 320, which is connected to the left housing half 310, which also includes a cover plate 322 to reduce the radiated heat from the housing 310. The liquid hydrazine is introduced into the gas generator 300 through an injector assembly 330, shown in FIGS. 1 and 2. The injector assembly 330 includes an injector housing 332 from which a number of spray arms 334 extend. In each of the spray arms 334 a number of nozzle apertures 336 are drilled, and it is through these nozzle apertures 336 that the liquid hydrazine is sprayed into the interior of the gas generator 300.

Returning to FIG. 1, the location and configurations of the catalyst beds are illustrated. The catalyst used is preferably Shell 405 catalyst, which are 14-18 mesh granules, and the catalyst is located in two catalyst bed, a primary catalyst bed 340 and a secondary catalyst bed 342. The primary catalyst bed is adjacent the injector assembly 330 at the left end of the gas generator 300 as illustrated in FIG. 1, and the catalyst granules of the primary catalyst bed 340 are contained in a primary catalyst canister 344 located in the left housing half 310.

Figure 7:
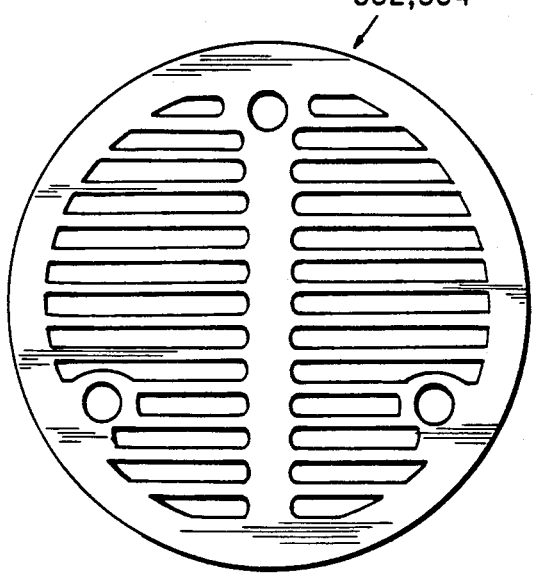
FIG. 7 is a plan view of a cover plate of the type used in the gas generator shown in FIG. 1.

The secondary catalyst bed 342, as mentioned before, is contained in a porous cylindrical canister which acts to confine the secondary catalyst bed 342. The secondary catalyst bed 342 is confined within a catalyst cylinder 350, and the catalyst is restrained within a catalyst cylinder 350 by two cover plates 352, 354 located at the two ends of the catalyst cylinder 350. The cover plates 352, 354 are identical, and have a number of apertures therethrough as illustrated in FIG. 7.

Referring once again to FIG. 1, the catalyst granules in the secondary catalyst bed 342 are kept inside the cover plates 352, 354 by two screens 356, 358, which are located within the catalyst cylinder 350 on the inside of the cover plates 352, 354, respectively. The screen 356 prevents catalyst particle migration from the primary catalyst bed 340 into the secondary catalyst bed 342, and vice versa. The screen 358 prevents catalyst particle migration from the secondary catalyst bed 342 out of the gas generator 300.

While the catalyst cylinder 350 supports the cover plates 352, 354 at their outer perimeters, a cylindrical cover support ring 360 is used between the cover plates 352, 354 to support the cover plates 352, 354 at a location nearer the center. The cover support ring 359 has a number of apertures therein to allow for gas flow within the gas generator 300.

The gas generator 300 uses a number of springs 360 to bias the secondary catalyst bed 342 and its enclosure against the primary catalyst bed 340. In the preferred embodiment illustrated herein, three springs 360 are used, although only one spring 360 is shown in FIG. 1. The springs 360 bear against the interior of the housing 312, and exert a bias on the secondary catalyst bed 342 through spring guides 362 extending within the springs 360, which in turn bear on a support plate 364 adjacent the cover plate 354 which comprises a portion of the apparatus enclosing the secondary catalyst bed 342. To center the cover support ring 359 a number of pins 366 through the cover plate 354 and the support plate 364 are used.

The secondary catalyst bed 342 and its enclosure, the support plate 364, and the spring guides 362 are held together in a unit assembled prior to installation in the housing 312 of the gas generator 300. A number of tie bolts 370 threaded into the spring guides 362 and through the support plate 364 and the cover plate 354 are threaded into spacers 372 within the secondary catalyst bed 342. Screws 374 are then inserted through the cover plate 342 and into the spacers 372 to complete the assembly, which may be then placed into the housing 312.

A poppet 380 is slidably mounted in the housing 312, the end of the poppet 380 extending into a guide assembly 382 screwed into the housing 312 with a seal 384. The poppet 380 also includes an O-ring 386 to seal the interior of the gas generator 300 from contamination, and a shear pin 388 to hold the poppet 380 in the position shown in FIG. 1 when the gas generator 300 is not in use.

When the gas generator 300 is started, gas generated within the gas generator 300 will push the poppet 380 rightwardly into the guide assembly 382, shearing the shear pin 388, which is typically nylon or some other soft material. The poppet valve will thus move to the position shown in phantom lines 389 in FIG. 1, allowing gas to exit the gas generator 300 through the gas exit aperture 390.

The basic component of the present invention which prevents destructive oscillatory vibration within the gas generator 300 is the ratchet assembly 400 shown in cutaway side view in FIG. 1, and end views in FIGS. 3 and 4. The ratchet assembly 400 is threaded into the housing 312 as shown in FIG. 1, and is then backed out of the housing 312 to the left tightly against the support plate 364 and the secondary catalyst bed 342 to prevent destructive oscillatory vibration of the catalyst in the primary catalyst bed 340.

Figure 6:
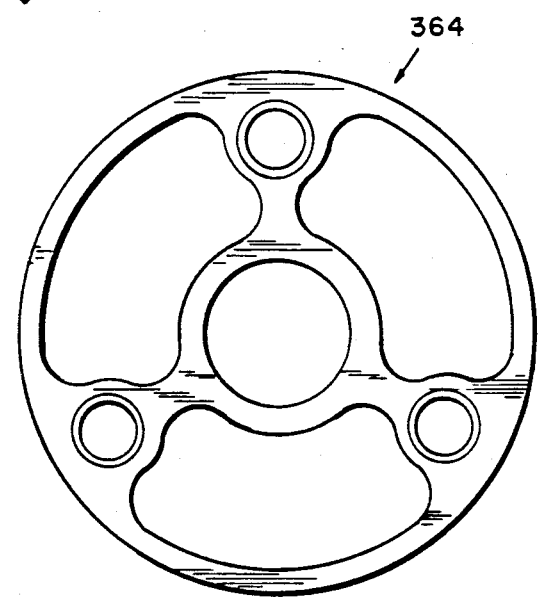
FIG. 6 is a plan view of the support plate used in the gas generator of FIG. 1.

The end of the ratchet assembly 400 bearing against the support plate 364 is best illustrated in FIG. 3. The ratchet assembly 400 has three ratchet support legs 402 which present a flat surface to the support plate 364 (FIGS. 1 and 6). The support legs 402 are so configured so as to have apertures 404 between these support legs 402 and the side of the ratchet assembly 400. In addition, a hex head aperture 406 in the ratchet support legs 402 is provided for adjustment of the ratchet assembly 400. The ratchet apertures 404 and the hex head aperture 406 allow gas generated in the catalyst beds of the gas generator 300 to pass through the ratchet assembly 400 to the gas exit aperture 390 (FIG. 1).

Referring now to FIGS. 1 and 4, it may be seen that the ratchet assembly 400 has six ratchet teeth 410 mounted on slender ratchet arms 412. The ratchet arms 412 allow for slight inward movement of the ratchet teeth 410 for purposes of installation and adjustment of the ratchet assembly 400, as will be discussed later.

The housing 312 has a number of pawl teeth 414 machined therein, against which the ratchet teeth 410 on the ratchet assembly 400 (FIGS. 1 and 4) interact. Once the ratchet assembly 400 is threaded into the housing 312, it may only move outwardly against the support plate 364, as shown in FIG. 1. The ratchet teeth 410 and the pawl teeth 414 thus prevent the ratchet assembly 400 from moving inwardly into the housing 312 away from the support plate 364.

The installation of the ratchet assembly 400 into the housing 312 is done by restraining the ratchet teeth 410 slightly inwardly so that the ratchet assembly 400 may be screwed into the housing 312. One way of doing this is to provide the surface of the ratchet teeth shown in FIG. 4 with a ridge 420 adjacent a valley 422 on the surface of the ratchet teeth 410, as shown in FIG. 4A. An elastic band may be tightly wrapped around all of the ratchet arms 412 (FIG. 1) to draw the ratchet teeth 410 centrally inward, and a thin cylinder (not shown) may be inserted into the valleys 422 of the ratchet teeth 410 to hold the ratchet teeth 410 in the inwardly restrained position. The rubber band may then be removed from the ratchet arms 412 and the ratchet assembly 400 may then be threaded freely into the housing 312. The thin cylinder (not shown) may then be removed, and the ratchet teeth 410 will spring outwardly against the pawl teeth 414 of the housing 312.

After assembly of the gas generator 300 is complete, the guide assembly 382 and the poppet 380 may be removed from the end of the housing 312, and a hex wrench may be inserted into the hex head aperture 406 (FIG. 3) of the ratchet assembly 400 for purposes of adjusting the ratchet assembly 400 tightly against the support plate 364. The poppet 380, along with a shear pin 388 and the guide assembly 382 are then reinserted into the housing 312, and the device is complete.

In the preferred embodiment, the poppet 380 is sized to keep the ratchet teeth 410 firmly against the pawl teeth 414 in the housing 312, as shown in FIG. 1. This technique prevents vibration and abrasion of the ratchet teeth 410 against the pawl teeth 414. When the gas generator 300 begins to generate gas, the pressure within the gas generator 300 will force the poppet 380 into the guide assembly 382, fracturing the shear pin 388 and allowing gas to escape through the gas exit aperture 390.

After the gas generator 300 has been operated, when the aircraft has returned to the ground for maintenance the shear pin 388 is normally replaced by removing the guide assembly 382 and the poppet 380. At this time, a hex head wrench may be inserted into the hex head aperture 406 of the ratchet assembly 400, so that the ratchet assembly 400 may be tightened against the support plate 364, thus compensating for catalyst bed compaction and degradation in the primary bed.

By coordinating the selection of the thread pitch on the ratchet assembly 400 and the housing 312 with the number of pawl teeth 414 in the housing 312 the adjustment of the device may be varied. It has been found that an increment of 0.0015 inches per ratchet click is an acceptable adjustment; this means that turning the ratchet assembly 400 one ratchet click will move the support plate 364 and the secondary catalyst bed 342 and its enclosure 0.0015 inches toward the primary catalyst bed 340. The device illustrated in FIG. 1 is designed to allow a total adjustment of approximately 0.35 inches.

Design of the ratchet assembly 400 has made it possible for a retrofit operation on existing gas generators. By machining threads and pawl teeth into the housing 310 of a gas generator, and providing the ratchet assembly 400, the support plate 364, and a different poppet 380 an existing gas generator may be modified to provide the advantages of the present invention.

By providing the ratchet no-back described above, substantial advantage over pre-existing gas generators is achieved at a remarkably low cost. It has been found that the catalyst in the gas generator will last fully ten times longer with the present invention installed in an ambient operating temperature of 70° F., and approximately 300 times longer at a ambient temperature of −40° F., the latter condition being encountered by military aircraft flying at relatively high altitudes. The cost savings achieved by the present invention are therefore substantial, since the catalyst used is very expensive.

In addition, since only a few seconds are necessary to tighten the ratchet assembly 400 after the gas generator 300 is used, and since this may be done at the same time the shear pin 388 is replaced, which is standard operating procedure with gas generators not using the present invention, a substantial amount of labor and time may be saved since the gas generator 300 of the present invention does not have to be rebuilt or have the catalyst replaced nearly as often as pre-existing gas generators. In addition, military aircraft will have less downtime due to work required to be performed on the gas generator.

Since the extra cost accompanying the present invention is more than compensated for by a single replacement of catalyst in the gas generator, it can be seen that the present invention achieves an advantageous cost reduction over preexisting gas generators. This fact, when combined with the extended lifetime and assured dependable performance characteristics of the gas generator including the present invention make the present invention a substantial improvement over preexisting gas generators.

What is claimed is:

1. A gas generator, comprising:
   a housing containing an internal cavity;
   a bed of catalyst particles contained within a portion of said internal cavity;
   plate means in said housing for containing said particles within said portion of said internal cavity;
   ratchet means located in said housing for moving said plate means in a first direction tending to compact said particles, said ratchet means being operable only in a single direction to prevent movement of said plate means in a second direction opposite to said first direction.

2. A gas generator as defined in claim 1, wherein said housing further comprises:
   an inlet for receiving a pressurized liquid fuel flow, said inlet leading into said cavity; and
   an outlet for discharge of a motive gas discharge flow, said outlet leading from said cavity.

3. A gas generator as defined in claim 2, further comprising:
   a porous canister containing catalyst particles, said bed of catalyst particles being located between said inlet and said porous canister, said porous canister including as a part thereof said plate means, said porous canister being operatively connected to and driven by said ratchet means to move in said first direction to compact said particles in said bed of catalyst particles.

4. A gas generator as defined in claim 2, further comprising:
spray means within said cavity for spraying said pressurized liquid fuel flow into said bed of catalyst particles, said liquid fuel reacting with said catalyst to form said motive gas discharge flow.

5. A gas generator as defined in claim 4, wherein said pressurized liquid fuel flow is supplied to said spray means in pulses, the rate of said pulses being varied to control the amount of said motive gas discharge flow generated.

6. A gas generator as defined in claim 1, wherein said catalyst particles are made of Shell 405.

7. A gas generator as defined in claim 1, further comprising:
biasing means for urging said plate means into said particles to compress said particles.

8. A gas generator as defined in claim 7, wherein said biasing means comprise:
at least one spring bearing against said housing.

9. A gas generator as defined in claim 1, wherein said ratchet means is adjustable to compensate for compaction and degradation in said catalyst particles caused by operation of said gas generator.

10. A gas generator as defined in claim 1, wherein said ratchet means comprises:
a ratchet assembly threadably mounted in said housing, said ratchet assembly moving in said first direction when said ratchet assembly is turned a first wise, and tending to move in said second direction if said ratchet assembly is turned the opposite wise; and
pawl means contained in said housing, said pawl means cooperating with said ratchet assembly to prevent said ratchet assembly from being turned said opposite wise when said ratchet assembly is installed in said housing.

11. A gas generator as defined in claim 10, wherein said pawl means comprises:
a plurality of pawl teeth machined into said housing, the number of said pawl teeth and the thread pitch of said ratchet assembly determining how far said ratchet assembly moves in said first direction when said ratchet assembly is turned in said first wise from one of said pawl teeth to the next adjacent one of said pawl teeth.

12. A gas generator as defined in claim 11, wherein said ratchet assembly comprises:
a plurality of ratchet teeth adjacent to said pawl teeth, said ratchet teeth being mounted on flexible ratchet arms, said flexible ratchet arms allowing said ratchet teeth to move past one of said pawl teeth to the next adjacent one of said pawl teeth when said ratchet assembly is turned in said first wise, said ratchet teeth cooperating with said pawl teeth to prevent movement of said ratchet assembly in said opposite wise.

13. A gas generator as defined in claim 12, wherein said ratchet assembly is assembled into said housing by restraining said ratchet teeth to prevent communication with said pawl teeth and turning said ratchet assembly in said opposite wise.

14. A gas generator as defined in claim 1, wherein said ratchet means contains an aperture therein to allow the passage of gas generated in said gas generator.

15. A gas generator, comprising:
a housing having an inlet for receiving a pressurized liquid flow and an outlet for discharging a motive gas flow;
a porous bed of catalyst particles disposed within said housing adjacent said inlet, said catalyst particles for reacting with said liquid flow to generate said motive gas flow;
plate means located in said housing for containing said bed within a confined space;
biasing means for exerting a force on said plate means in a first direction tending to compact said bed of catalyst particles; and
ratchet means mounted in said housing for preventing movement of said plate means in a second direction opposite said first direction, said ratchet means adjustable for one-way movement in said first direction.

16. A gas generator as defined in claim 15, wherein said ratchet means includes:
pawl teeth contained in said housing;
a rotatable ratchet assembly threadably mounted in said housing, said ratchet assembly including ratchet teeth allowing rotary motion of said ratchet assembly in only one wise, rotation in said one wise causing movement of said plate in said first direction.

17. A gas generator comprising:
a housing;
a bed of granular catalytic material within said housing;
plate means for compacting said catalytic material when said plate means is urged in a first direction;
ratchet adjustment means mounted in said housing for exerting a pressure on said plate means tending to urge said plate means in said first direction, said ratchet adjustment means being adjustable in only a single direction to urge said plate means in said first direction to compact said catalyst.

18. In an emergency power unit having a variable pulse, pressurized fluid feed flow, a gas generator for producing a motive gas discharge flow, comprising:
a housing having an internal cavity with an inlet for receiving said feed flow, and an outlet for said gas discharge flow;
a first bed of catalyst particles disposed in said cavity adjacent said inlet;
a second bed of catalyst particles disposed in said cavity within a porous canister, said first bed of catalytic particles being between said inlet and said canister, said canister being moveable in a first direction tending to compact said first bed of catalytic particles and a second direction opposite to said first direction; and
ratchet adjustment means for preventing movement of said canister in said second direction.

19. A method of generating a controlled emergency flow of motive gas, comprising:
delivering a pulsed, pressurized liquid fluid flow at a variable pulse rate;
reacting said fluid flow with a confined bed of catalyst particles to generate said emergency flow of motive gas, the pulsing of said fluid flow tending to cause vibration in said bed of catalyst particles;
inhibiting said vibration in said bed caused by said pulsing of said fluid flow by confining said bed of catalyst particles with a plate and providing a ratchet adjustment of said plate to prevent movement of said plate away from said bed of catalyst particles, said ratchet adjustment operating in a one-way direction.

20. A method as defined in claim 19, wherein said inhibiting step includes executing said ratchet adjustment after each emergency generation of gas.

21. A method as defined in claim 19, wherein ratchet adjustment is provided by turning a ratchet assembly to move said plate toward said bed.

22. A method of generating a motive gas flow, comprising:

providing a housing with an inlet for receiving a pressurized liquid flow and an outlet for discharging said motive gas flow;

installing a bed of catalyst particles in said housing, said catalyst particles for reacting with said liquid flow to generate said motive gas flow;

confining said bed of catalyst particles within a confined space in said housing with a porous plate;

biasing said plate in a first direction tending to compact said bed of catalyst particles; and preventing movement of said bed of catalyst particles in a second direction opposite to said first direction by tightening a ratchet assembly to prevent movement of said plate in said second direction, said ratchet moving only in said first direction.

* * * * *